Patented May 14, 1929.

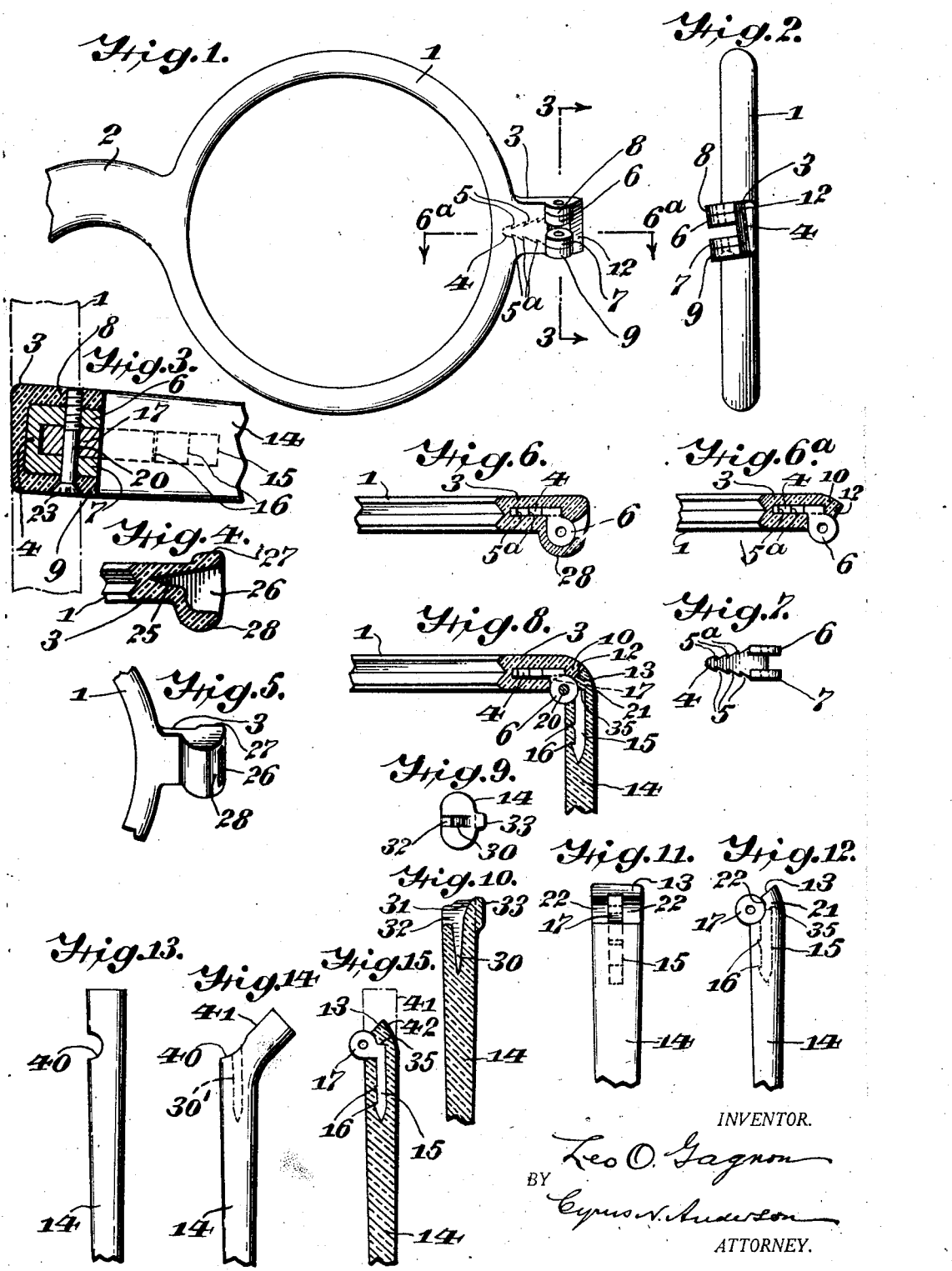

1,713,120

UNITED STATES PATENT OFFICE.

LEO O. GAGNON, OF NEWARK, NEW JERSEY, ASSIGNOR TO CONTINENTAL OPTICAL CORPORATION, OF NEW YORK, N. Y., A CORPORATION OF DELAWARE.

ZYLONITE SPECTACLE FRAME.

Application filed April 15, 1926. Serial No. 102,162.

This invention relates to ophthalmic mountings, particularly to the means for effecting pivotal connection between the temple bars and the opposite ends of the lens holding element of a spectacle frame consisting of zylonite, celluloid or other like material.

In the construction of spectacle frames, in which the temple bars and the lens holding elements thereof consist of zylonite, celluloid or other like material, it has been found to be difficult to provide satisfactory means for effecting pivotal connection between the said bars and the opposite ends of the said element. Many attempts have been made to provide a satisfactory connection between these two elements but thus far without the attainment of complete success.

It is an object of the present invention to provide a construction of novel character by which these elements may be pivotally connected which not only is simple but which at the same time is rugged and durable.

It also is an object of the invention to provide a construction of novel character in which metal elements are employed for effecting the pivotal connection between the lens holding frame and the temple bars and in which, when the said temple bars are in open position, the outer end portions of the said elements are concealed from view so that when frames embodying the invention are being worn the said metal connections are not visible to persons who may be associated or who may be passing the person wearing the same.

To these and other ends the invention comprehends the construction as hereinafter described in detail and as illustrated in the drawing in which a preferred form thereof is shown.

In the drawing:

Fig. 1 is a view in rear elevation of approximately one-half portion of the lens holding element or frame of an ophthalmic mounting, the temple bar to be associated therewith being omitted;

Fig. 2 is a view in end elevation looking toward the left in Fig. 1;

Fig. 3 is a transverse section taken along the line 3—3 of Fig. 1;

Fig. 4 is a horizontal sectional view of one end of a lens holding element including a temple lug which is provided with an opening or cavity for the reception of a metallic hinge member.

Fig. 5 is a view in rear elevation of the portion of the mounting shown in Fig. 4;

Fig. 6 is a view similar to that shown in Fig. 4, after the insertion of a hinge member into the cavity shown in said figure and after the compression of the zylonite about said hinge member to flatten the front projection and to cause a more efficient interlocking relationship between the said hinge member and the zylonite;

Fig. 6$^a$ is a view similar to that shown in Fig. 6, but taken on the line 6$^a$—6$^a$ of Fig. 1 and showing a portion of the zylonite adjacent the outer end of the hinge member milled or cut away;

Fig. 7 is a view in rear elevation of the hinge member shown in Fig. 6, detached from the zylonite portion of the frame;

Fig. 8 is a view in horizontal section of one end portion of an opthalmic mounting embodying the invention, the temple bar being shown in open extended position, substantially in right angular relation to the plane of the lens holding element of the frame;

Fig. 9 is a view in front end elevation of a temple bar after the same has been provided with a cavity for the reception of a metallic hinge member and before the latter has been inserted thereinto;

Fig. 10 is a view in longitudinal section of the temple bar, the end of which is shown in Fig. 9;

Fig. 11 is a view in inside elevation of the front end portion of a temple bar after the attachment thereto of a metallic hinge member;

Fig. 12 is a view in side elevation of the front end portion of a temple bar constructed according to the method embodying my invention;

Fig. 13 is a view in side elevation of the front end portion of a temple bar showing the first step in a slightly modified method which may be employed in securing the metal hinge member to the bar;

Fig. 14 is a view in side elevation indicating a subsequent step in the said method; and Fig. 15 is a view in longitudinal section showing the front end portion of a temple bar made in accordance with the method indicated in Figs. 13 and 14.

Upon reference to the drawing, it will be noted that I have illustrated approximately one-half portion only of the lens holding element or frame of an ophthalmic mounting embodying my invention in which 1 designates a lens holding rim and 2 the bridge by which the opposite rim (not shown) is connected with the rim which is shown.

Exactly the same construction of hinge connections is employed at the opposite ends of the mounting; hence in the further description of the invention one end only of the frame or mounting will be referred to and the singular number will be employed.

As already indicated, the mounting comprises zylonite or its equivalent. The rim 1 is provided with an outwardly extending projection 3, frequently called a temple lug, into the outer end of which a tapered or wedge-shaped member 4 of metal is inserted. This wedge-shaped member has serrations or notches 5 upon its opposite edges which provide projections 5ª which extend outwardly or toward the outer end thereof, as is clearly shown in Figs. 1 and 7 of the drawing. The opposite edges of the outer end portions of the tapered member 4 are provided with circular ears 6 and 7 which may be formed by first stamping the member 4 from a sheet metal plate with the ears 6 and 7 extending in opposite directions in the same plane as the tapered portion 4. Thereafter the ears are turned into positions at right angles to the plane of the tapered portion, as is shown in the drawing. Obviously the member 4 with the projections 6 and 7 thereon may be formed in any other preferred manner. The outwardly extending projection or temple lug 3, previously referred to, is provided with rearwardly extending ears 8 and 9 integral therewith which are located outside of and in contact with the ears 6 and 7 when the latter, with the tapered portion 4 integral therewith, are in position, as shown in Figs. 1, 2, 3, 6 and 8 of the drawing. The ears 6 and 7 and 8 and 9 are of the same shape and of the same diameter. The outer end portion of the lug 3 partially surrounds the outer circumferences of the circular ears 6 and 7 and a portion thereof in the form of a shoulder 10 overlies and conceals the outer end of the tapered portion 4. The extreme outer end of the lug 3 terminates in a rearwardly and inwardly inclined surface 12 which constitutes an abutment against which a corresponding surface 13 upon the front end of the associated temple bar 14 contacts when the latter is in open and extended position, as shown in Fig. 8 of the drawing. The temple bar 14 is provided at its front end with a metal hinge member comprising a pointed pin-like portion 15 having barbs or projections 16 upon its inner side which are adapted to engage with the material of the temple bar. This material, as already indicated, consists of zylonite. The front end of the pin 15 is provided with a circular ear or projection 17 which is adapted to fit into the space between the ears 6 and 7, previously referred to. The surface 13 extends entirely across the outer side of the front end of the temple bar and, as already suggested, is adapted to abut against the corresponding surface 12 upon the outer end of the lug 3. The ears or projections 6, 7, 8, 9 and 17 are provided with openings through the centers thereof through which a pivot screw 20 is adapted to pass for the purpose of pivotally connecting the same together to effect pivotal connection of the temple bar 14 and the temple lug 3.

It will be noted that the outer side of the front end portion of the pin 15 abuts against and is concealed by a shoulder 21 and also that a portion of the material of the temple bar extends partially around the circumference of the circular ear or projection 17.

Circular or arc-shaped depressions are formed upon the inner side of the temple bar 14 upon opposite sides of the circular ear or projection 17, as shown at 22.

As indicated in Fig. 3 of the drawing, the projection or ear 9 is countersunk for the reception of the head 23 of the pivot screw 20, while the openings through the ears or projections 6 and 8 are screw-threaded for engagement with the screw threads upon the screw-threaded end of the pivot screw 20.

It is quite apparent that when a temple bar is connected by a pivot screw 20 to a temple lug 3 and when the same is in open, extended position, as shown in Fig. 8 of the drawing, no part of the metal connection is visible, except the circumferential portions of the ears or projections 6, 7 and 17 upon the inner side of the angle between the temple bar and the lug 3. In other words, when a pair of spectacles is being worn by a person, no part of the metal hinge connections at the opposite ends of the frame is visible. Likewise, when the temple bars are in closed or collapsed position, the only portions of the metal connections which are visible are the outer portions of the circumferences of the projections or ears 6, 7 and 17 intermediate the end surfaces 12 and 13, previously referred to.

I shall now refer to the method employed by me in the attachment of the tapered member 4 with the ears or projections 6 and 7 thereon to a lug 3.

According to the method preferred by me, the said lug 3 is first heated to soften the same. Thereafter an opening is formed in the said lug extending from the outer end thereof inwardly, which opening terminates short of the inner side of the rim 1, as is clearly shown. The inner portion of the opening is of reduced pointed shape and of a size such that in inserting the said hinge member into the said opening it is necessary to use some force to cause the portion 4 to enter the portion 25 of the opening. The said hinge member is heated so that when the portion 4 is inserted into the opening 25 the surrounding material of the lug is melted so that it flows into intimate contact and engagement with the notches and projections 5 and 5ª. The outer end of the opening is enlarged, as indicated at 26, for the reception of the portions 6 and 7 of the metal hinge member.

In enlarging the said opening portions of the material upon the front and rear sides of the lug 3 are caused, by the use of suitable tools or devices, to project forwardly and rearwardly, as indicated at 27 and 28. The formation of the temple lug with a hinge-member receiving recess or opening and with front and rear projections may be effected in any other known manner. The greater part of the enlargement at the outer end of the opening extends or projects to the rear, so that the projecting portion 28 is of greater height than the projecting portion 27. The enlarged outer end portion of the opening is adapted to receive the ears or projections 6 and 7. After the metal hinge member has been placed in position within the said opening and while the temple lug 3 is of a temperature to render the same more or less plastic and compressible it is placed in a suitable press or die and pressed tightly about the said hinge member so as to flatten the projection 27 and cause the material of the said lug including the projection 28 to hug closely against the said member, as is clearly indicated in Fig. 6 of the drawing and as has been previously described. Thereafter, the material of the lug is cut away at its outer end to form the surface 12 and the material of the projection 28 is also cut away to form the ears 8 and 9 corresponding with the ears 6 and 7 and which are located upon the outside of and in contact with the latter.

In this manner the metal hinge member is firmly attached or connected with the lug 3, the permanency of such connection being insured by the engagement of portions of the material of the temple lug which are projected into the serrations 5 and by the shoulder 10 which overlies the outer end of the portion 4 of the said member.

In like manner the hinge member comprising the parts 15 and 17 is secured to the front end portion of the temple bar 14. The said temple bar is first heated so as to render the same more or less plastic. Thereafter, an opening is formed therein which extends longitudinally thereof. The said opening comprises an inner reduced portion, as indicated at 30, and an outer enlarged portion, as indicated at 31. The inner portion of the material of the bar in line with the outer end portion of the opening is cut away, as indicated at 32, so as to provide space for the ear 17 of the metallic hinge member which is to be secured to the forward end of the said bar.

In producing the opening with the enlarged outer end portion 31 a projection 33 is formed upon the outer side of the forward end portion of the temple bar. When the portion 15 of the hinge member is inserted into the opening 30 it preferably is of a temperature to melt or soften the material of the bar so that it will flow into close engagement therewith and with the projections or spurs 16. Thereafter the front end of the temple bar is placed in a press or die and subjected to pressure to flatten the projection 33 and cause the material of the bar to hug closely against the hinge member. A portion of the material at the front end of the temple bar is caused to extend partially around the circumference of the circular eye 17 and a shoulder at 35 serves as an additional means to prevent the hinge member from being disconnected from the temple bar. Thereafter, also, the front end of the temple bar is cut away so as to form the surface 13, previously referred to.

In Figs. 13, 14 and 15 a somewhat different method of operation is indicated. In the method as indicated in those figures a notch 40 of arcuate shape is provided in the inner side of the temple bar, a short distance from the front end thereof. The front end portion of the temple bar is then heated so as to render the same more or less plastic, after which the forward end portion is bent away from the said notch, as indicated at 41. A hole or opening 30' is formed by drilling or otherwise in the forward end portion of the said bar. The forward end of said hole terminates substantially at the bottom of the notch 40. The hinge member comprising the parts 15 and 17 is then inserted into the opening 30', as indicated in Fig. 14, after which and while the front end portion of the temple bar is at a temperature such as to render the same pliable the outwardly bent forward end portion 41 is returned to more or less normal position. The said forward end portion is placed in a die or press and subjected to pressure so as to cause portions thereof to extend part way around the circular eye 17 and to form a shoulder in front of the front end of the member 15. Thereafter, the front end portion of the temple bar is cut away so as to form the surface 13 and also so as to slightly taper or bevel the outer side thereof, as indicated at 42.

The resultant construction is the same whether the method as indicated in Figs. 5 and 9 is employed or whether the method as indicated in Figs. 13 and 14 is employed.

It will be seen that by my invention I am enabled to provide a structure of ophthalmic mounting comprising zylonite or an equivalent material in which the metallic hinge members or elements of the construction are almost completely hidden and whereby also a construction which is strong and rugged in character is produced.

By the term "zylonite" employed in the specification and claims I intend to include not only the material known generally as zylonite in this art, but also celluloid or any other material of a similar or a suitable character adapted for use in the manufacture of ophthalmic mountings.

Having thus described my invention, what I claim and desire to secure by Letters Patent is:

1. A hinge connection for securing a temple bar to a temple lug of an ophthalmic mounting of zylonite, comprising metal hinge members having laterally extending hinge ears, one of the said members being secured in and extending longitudinally of the said lug, the latter having ears conforming to and overlying the hinge ears of the said metal hinge member, and the other of said hinge members being secured within and extending longitudinally of the front end portion of the said temple bar, the hinge ear thereof projecting inwardly and the said temple bar having a portion conforming to and overlying a part of the periphery of the ear of said hinge member and the front end portion of said hinge member.

2. An ophthalmic mounting comprising a lens holding frame having temple lugs projecting outwardly from its opposite ends, metallic hinge members secured in and extending longitudinally of the said lugs, the said members being provided with laterally and rearwardly extending hinge ears and the said lugs being provided with ears which overlie the outer sides of the said hinge ears, and the material of the said lugs partially overlying the outer ends of the said hinge members, temple bars having metallic hinge members secured in the front ends thereof, the said metallic hinge members having hinge ears which project inwardly, and portions of the front ends of the said temple bars overlying portions of the front ends of the said last mentioned metallic hinge members, and means for pivotally connecting the hinge ears of the said hinge members together, substantially as described.

3. An ophthalmic mounting of zylonite, comprising a lens holding frame having temple lugs projecting outwardly from its opposite ends, metallic hinge members secured within openings extending longitudinally of the said lugs, the said hinge members each being provided with spaced ears which project rearwardly, the distance between the outer sides of said ears being less than the width of the said lugs, and the said lugs being provided with ears which overlie the outer sides of the said hinge ears, the said ears having holes extending therethrough, and one of the said hinge ears of each hinge member and its overlying ear being provided with screw threads, and portions of the outer ends of the said lugs overlying portions of the outer ends of the said hinge members, temple bars each of which is provided with an opening in its front end which extends longitudinally thereof, metallic hinge members mounted within said openings the front end of each of said members being provided with a centrally located inwardly extending ear having an opening therethrough and portions of the front ends of the said temple bars overlying portions of the front ends of the hinge members mounted in the openings therein, and the inwardly extending ears of the said hinge members being located between the hinge ears of the hinge members mounted within the said lugs, and pivots extending through the openings in said ears for pivotally connecting the temple bars to the temple lugs.

In testimony that I claim the foregoing as my invention, I have hereunto signed my name this 5th day of April, A. D. 1926.

LEO O. GAGNON.